United States Patent
Boone et al.

(10) Patent No.: US 11,632,912 B2
(45) Date of Patent: Apr. 25, 2023

(54) TINE PLATE FOR AN AGRICULTURAL BALER

(71) Applicant: CNH Industrial America LLC, New Holland, PA (US)

(72) Inventors: Wouter Boone, Aalter (BE); Bram Rosseel, Snellegem (BE); Dries Liefooghe, Alveringem (BE); Dieter Kindt, Vladslo (BE); Jeroen Devroe, Izegem (BE)

(73) Assignee: CNH Industrial America LLC, New Holland, PA (US)

( * ) Notice: Subject to any disclaimer, the term of this patent is extended or adjusted under 35 U.S.C. 154(b) by 366 days.

(21) Appl. No.: 16/823,308

(22) Filed: Mar. 18, 2020

(65) Prior Publication Data
US 2020/0296898 A1    Sep. 24, 2020

(30) Foreign Application Priority Data
Mar. 18, 2019 (EP) ..................................... 19163373

(51) Int. Cl.
*A01F 15/10* (2006.01)
*A01F 29/04* (2006.01)

(52) U.S. Cl.
CPC .............. *A01F 15/10* (2013.01); *A01F 29/04* (2013.01)

(58) Field of Classification Search
CPC .......... A01F 15/10; A01F 29/04; A01F 29/02; A01F 2015/108; A01D 90/04
See application file for complete search history.

(56) References Cited

U.S. PATENT DOCUMENTS

| 4,907,503 A | * | 3/1990 | Ryan | A01F 25/14 100/177 |
| 6,775,967 B2 | * | 8/2004 | Wubbels | A01D 43/082 56/60 |
| 6,886,312 B1 | * | 5/2005 | Inman | A01F 25/183 53/529 |

(Continued)

FOREIGN PATENT DOCUMENTS

| CN | 214257205 U | * | 9/2021 | ............ A01D 45/10 |
| DE | 428588 C | | 5/1926 | |

(Continued)

OTHER PUBLICATIONS

Extended European Search Report for EP Application No. 19163373.4 dated Sep. 11, 2019 (five pages).

*Primary Examiner* — Arpad F Kovacs
(74) *Attorney, Agent, or Firm* — Peter Zacharias; Patrick Sheldrake

(57) ABSTRACT

A planar tine plate having a number of tines. The tine plate is configured to be arranged on a rotor shaft of a rotor cutter apparatus of an agricultural baler. The tine plate is for moving or conveying crop material collected by the agricultural baler, for example by a pickup apparatus of the agricultural baler. The tine plate has at least one first tine and at least one second tine spaced angularly from the at least one first tine. The at least one first tine has a length greater than that of the at least one second tine. An increase in the cleaning efficiency and the crop conveying efficiency of an area to be swept by the tine plate as the rotor shaft rotates may be achieved.

15 Claims, 4 Drawing Sheets

(56) References Cited

U.S. PATENT DOCUMENTS

| | | | |
|---|---|---|---|
| 7,716,910 B2 * | 5/2010 | Woodford | A01F 15/106 |
| | | | 56/364 |
| 7,867,072 B2 * | 1/2011 | Lauwers | A01D 90/04 |
| | | | 460/112 |
| 8,205,424 B1 | 6/2012 | Lang et al. | |
| 10,398,082 B2 * | 9/2019 | Rittershofer | A01D 41/1243 |
| 10,806,083 B2 * | 10/2020 | Baldini | A01D 89/002 |
| 2002/0116911 A1 * | 8/2002 | Steppat | A01D 43/082 |
| | | | 56/119 |
| 2010/0229520 A1 | 9/2010 | Lauwers et al. | |
| 2013/0167497 A1 | 7/2013 | Van De Weijer et al. | |
| 2015/0189835 A1 | 7/2015 | Chaney et al. | |
| 2016/0302363 A1 | 10/2016 | Ravaglia | |
| 2020/0359567 A1 * | 11/2020 | Shonk | A01F 15/10 |

FOREIGN PATENT DOCUMENTS

| | | | | |
|---|---|---|---|---|
| DE | 3500070 | A1 | 7/1986 | |
| DE | 3744386 | | 7/1989 | |
| DE | 19806630 | A1 | 8/1999 | |
| DE | 10017984 | A1 * | 10/2001 | ............ A01D 90/04 |
| DE | 10021748 | A1 | 11/2001 | |
| DE | 19541561 | B4 * | 12/2004 | ............ A01D 90/04 |
| DE | 102006048659 | A1 * | 5/2008 | ............ A01D 43/082 |
| DE | 102012204416 | A1 * | 9/2013 | ............ A01F 12/182 |
| DE | 202013008356 | U1 * | 1/2014 | ............ A01D 90/04 |
| DE | 102008044007 | B4 * | 2/2015 | ............ A01D 43/082 |
| DE | 202014003759 | U1 * | 9/2015 | ............ A01D 90/04 |
| DE | 102014116083 | A1 * | 5/2016 | ............ A01D 90/02 |
| DE | 102014225898 | A1 * | 6/2016 | ............ A01F 15/10 |
| DE | 102016102916 | A1 * | 8/2017 | ............ A01D 78/14 |
| DE | 102017108647 | A1 * | 10/2018 | ............ A01D 89/002 |
| EP | 0255074 | A1 * | 2/1988 | ............ A01C 190/04 |
| EP | 659332 | A1 * | 6/1995 | ............ A01D 90/04 |
| EP | 0815720 | A1 * | 7/1998 | ............ A01D 90/04 |
| EP | 2140753 | A1 * | 1/2010 | ............ A01D 90/04 |
| EP | 2387872 | A1 * | 11/2011 | ............ A01D 90/04 |
| EP | 2401907 | B1 * | 3/2013 | ............ A01D 43/082 |
| EP | 2893798 | A1 | 7/2015 | |
| EP | 3711473 | A1 * | 9/2020 | ............ A01F 15/10 |
| KR | 20110086486 | A * | 7/2011 | ............ A01F 15/10 |
| NL | 1023390 | C2 * | 11/2004 | ............ A01D 90/02 |
| WO | WO-8402252 | A1 * | 6/1984 | ............ A01D 90/02 |
| WO | WO-2017140797 | A1 * | 8/2017 | ............ A01D 78/14 |

* cited by examiner

TINE PLATE FOR AN AGRICULTURAL BALER

TECHNICAL FIELD

The present invention relates to a tine plate for a rotor cutter apparatus of an agricultural baler and in particular, but not limited to, a tine plate for arranging on a rotor shaft of the rotor cutter apparatus and for moving crop material collected by the agricultural baler. Aspects of the invention relate to a tine plate, to a rotor cutter apparatus, and to an agricultural baler.

BACKGROUND OF THE INVENTION

Agricultural balers are used to consolidate and package crop material so as to facilitate the storage and handling of the crop material for later use. For example, when the crop is hay a mower-conditioner is typically used to cut and condition the crop material for windrow drying in the sun. As another example, when the crop is straw an agricultural combine discharges non-grain crop material from the rear of the combine defining the straw which is to be picked up by the baler. The cut crop material is usually dried, and a baler, such as a large square baler or round baler, straddles the windrows and travels along the windrows to pick up the crop material and form it into bales.

On a large square baler, pickup apparatus at the front of the baler gathers the cut and windrowed crop material from the ground. The pickup apparatus includes a pickup roll, and optionally may include other components such as side shields, stub augers, a wind guard, etc. A rotor cutter apparatus is then used to move the crop material from the pickup apparatus to a pre-compression chamber or duct. The rotor cutter apparatus forms a so-called 'wad' of crop within the pre-compression chamber which is then transferred to a main bale chamber.

Stuffer apparatus transfers the wad of crop material in charges from the pre-compression chamber to the main bale chamber. Typically, the stuffer apparatus includes stuffer forks which are used to move the wad of crop material from the pre-compression chamber to the main bale chamber, in sequence with the reciprocating action of a plunger within the main bale chamber.

In the main bale chamber, after the wad is injected into the bale chamber, the plunger compresses the wad of crop material into a so-called 'flake' against previously formed flakes to form a bale and, at the same time, gradually advances the bale towards the outlet of the bale chamber. Pressure exerted by the walls of the bale chamber dictates the frictional force needed to overcome friction and shift the flakes in the chamber. An increased force to shift the flakes causes the plunger to compact the flakes tighter, and thereby produce a higher-density bale.

The bale chamber typically has three moving walls (a top wall and two side walls), which may be positioned by two hydraulically controlled actuators connected to a cam mechanism. When enough flakes have been added and the bale reaches a full (or other predetermined) size, a number of knotters are actuated which wrap and tie twine, cord, or the like around the bale while it is still in the main chamber. The twine is cut and the formed bale is ejected out the back of the baler as a new bale is formed.

Returning to the rotor cutter apparatus, typically this includes a rotor assembly having a rotor shaft and a number of rotor tines arranged on the rotor shaft. The tines rotate with the rotor shaft and engage with the crop to move the crop material from the pickup unit towards a knife rack with knives for cutting the crop into smaller pieces and then on to the pre-compression chamber. The rotor cutter apparatus also typically includes a scraper behind the rotor assembly and in the vicinity of the input or entrance to the pre-compression chamber. The scraper includes a number of scraper tines extending or pointing generally back towards the rotor assembly. As the rotor shaft rotates about its axis, the rotor tines intersect the scraper tines to remove crop material from the rotor tines and further direct the crop material towards the knives and the pre-compression chamber. The rotor tines therefore need to be designed so that they both: provide an effective means for delivering the crop material to the pre-compression chamber; and, allow the scraper to effectively remove crop from the rotor tines as they intersect with the scraper tines.

It is an aim of the present invention to provide an arrangement that is designed to provide the above effects.

SUMMARY OF THE INVENTION

According to an aspect of the present invention there is provided a tine plate for a rotor cutter apparatus of an agricultural baler. The tine plate is for arranging on a rotor shaft of the rotor cutter apparatus and for moving or conveying crop material collected by the agricultural baler. The tine plate may be for conveying collected crop material towards a pre-compression chamber of the agricultural baler. The tine plate comprises at least one first tine and at least one second tine spaced angularly from the at least one first tine. A length of the at least one first tine is greater than a length of the at least one second tine.

The tine plate may be generally circular shaped. A tine may also be referred to as a prong, sharp peak, protrusion, point or other suitable term. The at least one first tine may also be referred to as a long tine, and the at least one second tine may also be referred to as a short tine. Prior art arrangements provide tine plates with tines of the same size around their circumference. Advantageously, by providing a tine plate with tines of different size around its circumference, the cleaning efficiency and the crop conveying efficiency of an area to be swept by the tine plate as the rotor shaft rotates increases and may be maximised.

The length of one of the tines may be regarded as the distance from a tip or point of the tine to a body of the tine plate, for example to an inner edge of the tine plate. In such a case, the length of the tines is equal to their thickness in a radial direction. Alternatively, the length of one of the tines may be regarded as the length of one of the sides or edges of the tines.

The length of the at least one second tine may be greater than half of the length of the at least one first tine. The relative difference in length between each of the first and second tines may be any suitable difference.

The tine plate may comprise an inner edge and an outer edge. The inner edge may be arranged for mounting to the rotor shaft of the rotor cutter apparatus. Each of the first and second tines may be at the outer edge.

The angular spacing between the first and second tines may be less than or equal to 90 degrees.

The tine plate may comprise two first tines and two second tines. This may increase the efficiency of the tine plate as the cleaning frequency and the amount of crop that may be moved towards a pre-compression chamber by the tines increasing over a single rotation of the rotor shaft of the rotor cutter apparatus.

The two first tines may be arranged opposite each other. The two second tines may be arranged opposite each other. Advantageously, this allows for alternate sweeps of the crop by the long and short tines to improve cleaning and crop conveying efficiency.

The tine plate may comprise two tine plate segments. This may facilitate mounting the tine plate to, and removing the tine plate from, the rotor shaft of the rotor cutter apparatus. This may also facilitate manufacture of the tine plate.

According to another aspect of the invention there is provided a rotor cutter apparatus for an agricultural baler. The rotor cutter apparatus may comprise a rotor shaft. The rotor cutter apparatus may comprise a plurality of tine plates as described above. The tine plates may be being arranged axially along the rotor shaft. The at least one first tine of a first one of the tine plates may be adjacent to the at least one second tine of at least one of the tine plates adjacent to the first one of the tine plates.

Prior art arrangements may provide a tine plate with short tines between tine plates with longer tines. Longer tines may be regarded as providing a greater cleaning effect when used in conjunction with a scraper. In addition, the provision of short tines next to longer tines may be considered to provide a higher intake of crop material to a pre-compression chamber. The prior art is disadvantageous in that only the swept area of the tine plates having the longer tines benefits from increased cleaning efficiency, whereas the swept area of the tine plates having the shorter tines does not. The present invention is advantageous in that not only are short tines arranged next to, or beside, longer tines when the tine plates are arranged on the rotor shaft (so as to maintain the higher intake of crop material), but as each of the tine plates includes both long and short tines the cleaning efficiency is increased. This is because the swept area of each and every tine plate benefits from increased cleaning efficiency compared with the swept area of only alternate tine plates along the rotor shaft as in the prior art.

The rotor cutter apparatus may also be referred to as a pre-cutter apparatus or, in the case where no further cutting or chopping of crop is performed, a rotor assembly.

The at least one first tine of the first one of the tine plates may be adjacent to the at least one second tine of each of the two tine plates adjacent to the first one of the tine plates.

The plurality of tine plates may be spaced equally along the rotor shaft.

In some embodiments, the length of the at least one first tine of the first one of the tine plates is different from the length of the at least one first tine of another one of the tine plates. Alternatively, or in addition, in some embodiments the length of the at least one second tine of the first one of the tine plates is different from the length of the at least one second tine of another one of the tine plates.

The plurality of tine plates may be arranged parallel to one another.

In some embodiments, each of the first and second tines has a tip, and the tips of the first and second tines of the plurality of tines plates define one or more curves axially along the rotor shaft.

In some embodiments, the tips of the first tines along a row of the plurality of tines plates define one or more curves axially along the rotor shaft. Alternatively, or in addition, the tips of the second tines along a row of the plurality of tines plates define one or more curves axially along the rotor shaft.

The rotor cutter apparatus may comprise a scraper including a plurality of spaced apart scraper tines. The first and second tines of the tine plates may be arranged to intersect the scraper tines as the rotor shaft rotates.

The scraper tines may be spaced equally apart.

The rotor cutter apparatus may comprise a knife rack including a plurality of spaced apart knives. The first and second tines of the tine plates may be arranged to direct crop material collected by the agricultural baler towards and over the plurality of knives.

According to another aspect of the present invention there is provided an agricultural baler comprising a tine plate as described above. According to another aspect of the present invention there is provided an agricultural baler comprising a rotor cutter apparatus as described above.

BRIEF DESCRIPTION OF THE DRAWINGS

One or more embodiments of the invention will now be described, by way of example only, with reference to the accompanying drawings, in which.

DETAILED DESCRIPTION OF THE DRAWINGS

Figure 1:
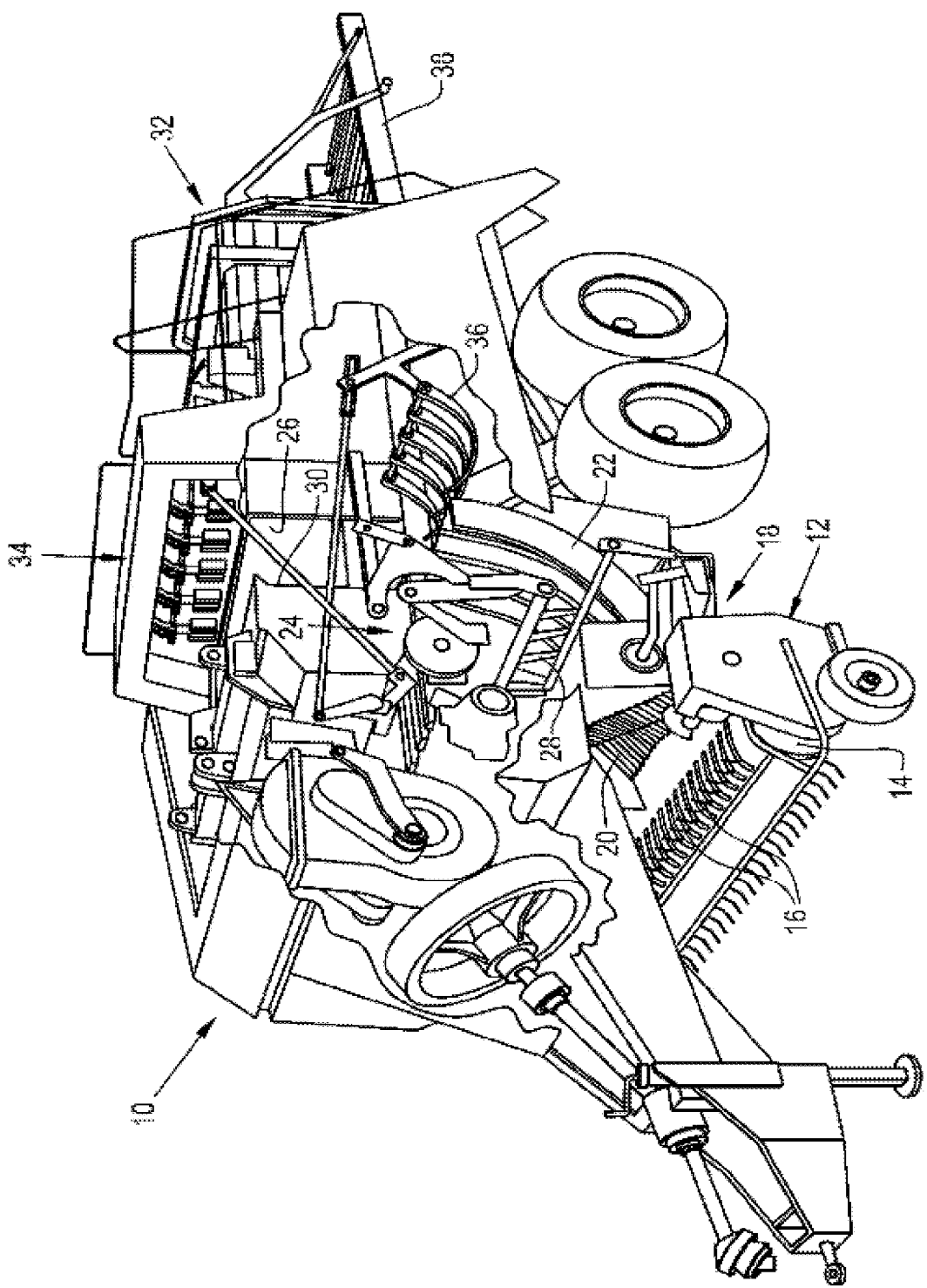
FIG. 1 is a perspective cutaway view of an agricultural baler including a crop pickup apparatus and a rotor cutter apparatus having a rotor assembly according to an embodiment of an aspect of the invention.

FIG. 1 shows an agricultural baler 10 in the form of a large square baler. In particular, FIG. 1 is a perspective cutaway view illustrating the inner workings of the large square baler 10. The baler 10 has a pickup unit or apparatus 12 for lifting crop material from windrows. The pickup apparatus 12 has a rotatable pickup roll (or rotor or cylinder) 14 with a number of pickup tines 16 to move the collected crop rearward towards a rotor cutter apparatus 18. Optionally, a pair of stub augers (one of which is shown, but not numbered) is positioned above the pickup roll 14 to move the crop material laterally inward.

The rotor cutter apparatus 18 has a rotor assembly with rotor tines 20 that push the crop towards a knife rack with knives for cutting the crop and into a pre-compression chamber 22 to form a wad of crop material. The tines 20 intertwine the crop together and pack the crop within the pre-compression chamber 22. The pre-compression chamber 22 and the rotor assembly with the tines 20 function as a first stage for crop compression. The rotor assembly and the tines 20 will be discussed in greater detail below.

Once the pressure in the pre-compression chamber 22 reaches a predetermined sensed value, a stuffer unit or apparatus 24 moves the wad of crop from the pre-compression chamber 22 to a bale chamber 26. The stuffer apparatus 24 includes stuffer forks 28 which thrust the wad of crop directly in front of a plunger 30, which reciprocates within the bale chamber 26 and compresses the wad of crop into a flake. The stuffer forks 28 return to their original state after the wad of material has been moved into the bale chamber 26. The plunger 30 compresses the wads of crop into flakes to form a bale and, at the same time, gradually advances the bale toward an outlet 32 of the bale chamber 26. The bale chamber 26 and plunger 30 function as a second stage for crop compression.

When enough flakes have been added and the bale reaches a full (or other predetermined) size, the knotters 34 are actuated which wrap and tie twine around the bale while it is still in the bale chamber. Needles 36 bring the lower twine up to the knotters 34 and the tying process then takes place. The twine is cut and the formed bale is ejected from a discharge chute 38 as a new bale is formed.

Figure 2:
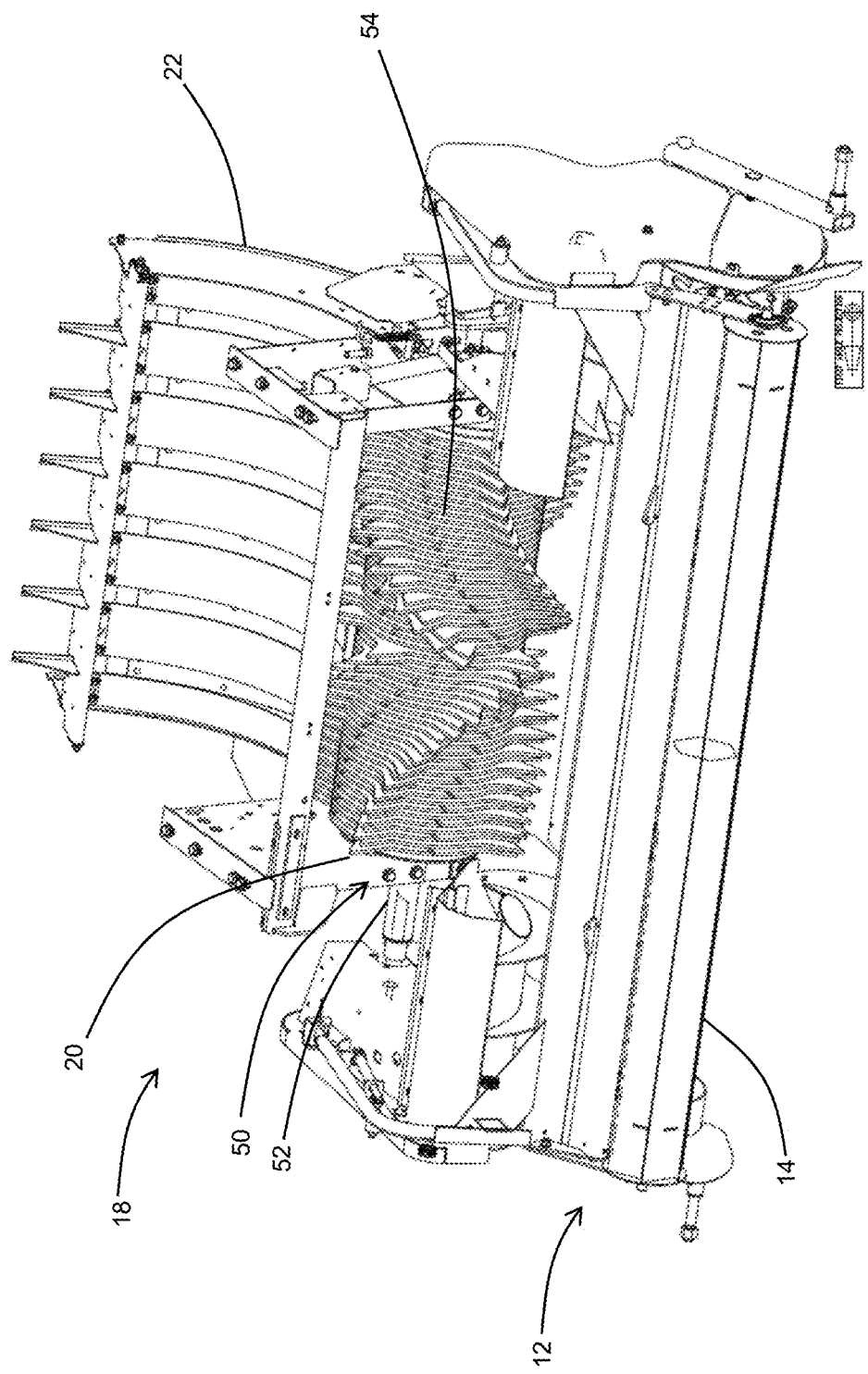
FIG. 2 is a perspective view of the crop pickup apparatus and rotor cutter apparatus having the rotor assembly of FIG. 1.
Figure 3:
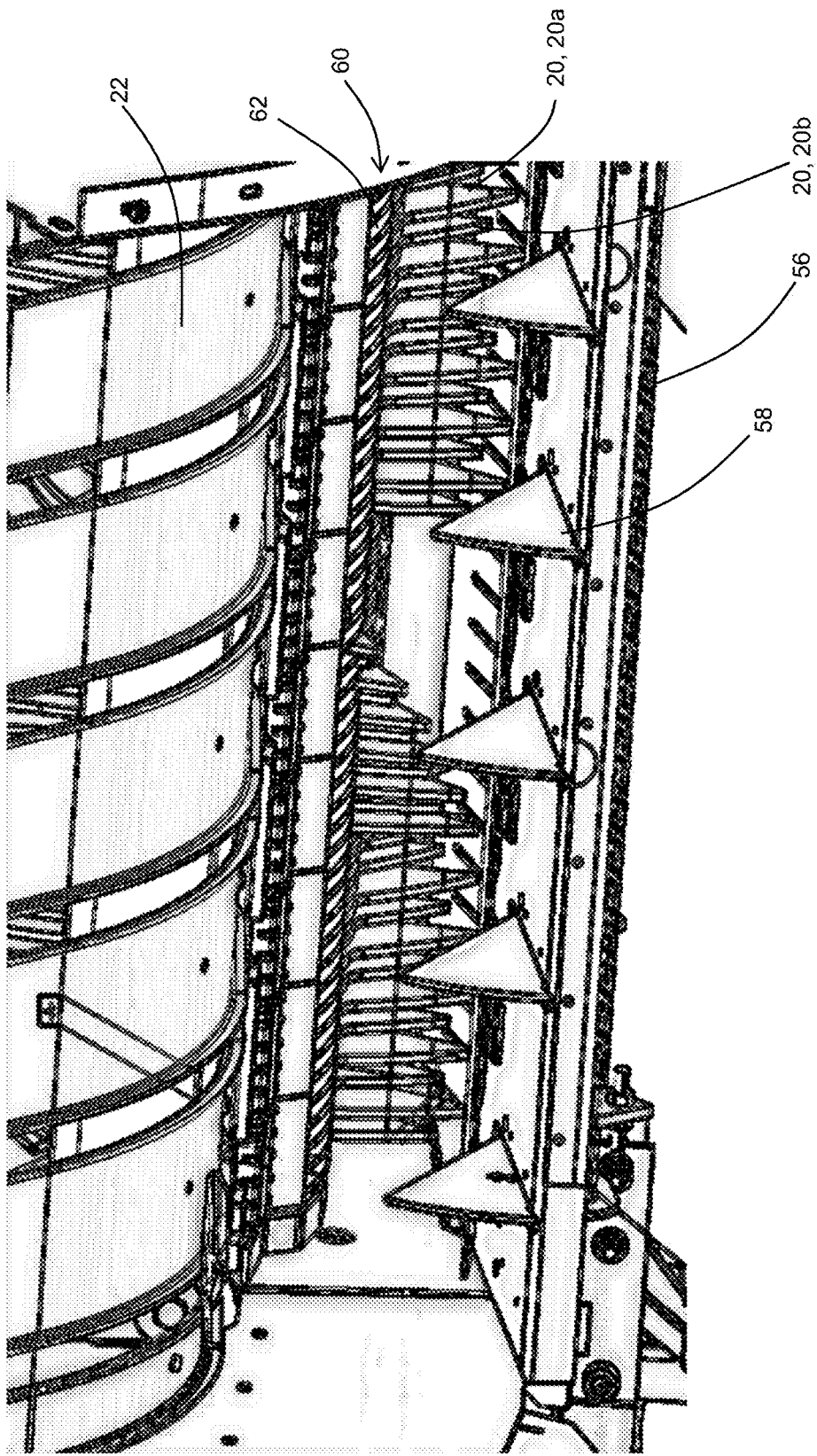
FIG. 3 is a partial rear view of the rotor cutter apparatus of FIG. 1, looking from inside a pre-compression chamber of the agricultural baler of FIG. 1 and towards tines and scrapers of the rotor cutter apparatus.

FIG. 2 shows a perspective view of the pickup apparatus 12 and the rotor cutter apparatus 18, and FIG. 3 shows a partial rear view of the rotor cutter apparatus 18 at the entrance or input to the pre-compression chamber 22. Referring to FIGS. 2 and 3, the rotor cutter apparatus 18 includes a rotor assembly 50 having a cylindrical rotor shaft 52 rotatable about its axis. The rotor assembly 50 also includes a number of tine plates 54 on the rotor shaft 52, where the tine plates 54 include the rotor tines 20.

The tine plates 54 are arranged and spaced axially along the length of the rotor shaft 52. The tine plates 54 are spaced equally apart and are parallel relative to each other. The tine plates 54 extend circumferentially all the way around the rotor shaft 52 and have a central circular mounting opening in which the rotor shaft is located. The tine plates 54 are formed from metal and are planar. There may be any suitable number of tine plates 54 on the rotor shaft, for example approximately 60 tine plates 54. The tine plates 54 will be discussed in greater detail below.

At a rear side of the rotor assembly 50 at an entrance to the pre-compression chamber 22 is a knife plate 56 including a number of blades or knives 58. In particular, the knife plate 56 is positioned at a lower side of the entrance to the pre-compression chamber 22. The knives 58 project upwardly from the knife plate 56. When the rotor shaft 52 rotates, crop material from the pickup apparatus 12 is collected and dragged or forced by the tines 20 towards and over the knives 58. The knives 58 cut the crop material into smaller pieces before it enters the pre-compression chamber 22. With reference to FIG. 3, the rotor tines 20 rotate in a direction towards the knives 58.

Also at the rear side of the rotor assembly 50 at an entrance to the pre-compression chamber 22 is a scraper 60. In particular, the scraper 60 is positioned at an upper side of the entrance to the pre-compression chamber 22. The scraper 60 includes a number of scraper tines 62 in a fork-like arrangement along the entire length of the entrance to the pre-compression chamber 22. The scraper tines 62 project or extend back towards the rotor assembly 50, i.e. away from the pre-compression chamber 22. Note that only an upper side of the pre-compression chamber 22 is shown in FIG. 3. In the described embodiment, the scraper tines 62 are equally spaced and the spacing between each scraper tine 62 is sufficient to allow one of the rotor tines 62 intersect and pass therethrough.

As may be seen in FIG. 3, as the rotor assembly 50, and therefore the rotor tines 20, rotate about the axis of the rotor shaft 52 the rotor tines 20 intersect the scraper tines 62 of the scraper 60. For example, the number of scraper tines 62 may be substantially equal to the number of rotor tines 20 so that a single rotor tine 20 intersects each gap or space formed between the scraper tines 62. When the rotor shaft 52 rotates, crop material that has been collected by the rotor tines 20 is removed or shredded or scraped from the rotor tines 20 by the scraper 60 as the rotor tines 20 intersect the scraper tines 62.

As will be understood with reference to FIG. 3, the rotor tines 20 intersect the scraper tines 62 from below to above the scraper tines as the rotor assembly 50 rotates. As such, the crop material that is removed from the rotor tines 20 by the scraper 60 will remain at a lower side of the scraper 60 and be directed towards and into the pre-compression chamber 22. In this way, the crop material is prevented from being returned to the ground from which it was initially collected and is instead provided to the pre-compression chamber 22 to form a wad.

Figure 4:
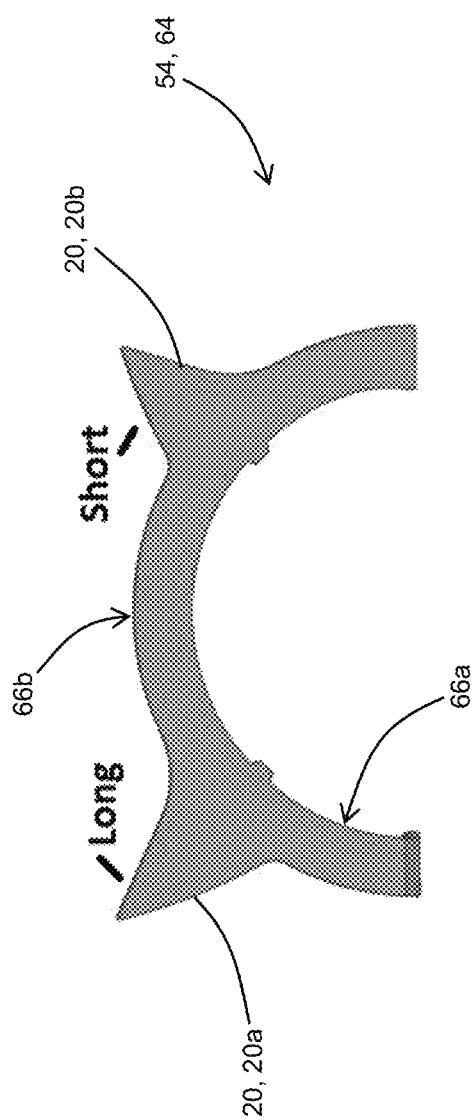
FIG. 4 is a schematic side view of a tine plate of the rotor assembly of FIG. 1.

The rotor tine plates 54 and rotor tines 20 are now discussed with reference to FIG. 4. In the present embodiment each tine plate 54 is formed from two tine plate segments 64, one of which is shown in FIG. 4. In the present embodiment, the tine plate segments 64 are semi-circular in shape, with an inner edge 66a matching an outer surface of the rotor shaft 52 to which it is to be attached. The tines 20 are located at an outer edge 66b of the tine plate 54. When the two tine plate segments 64 are brought together around the rotor shaft 52 they form the central circular mounting opening in which the rotor shaft 52 is located.

FIG. 4 shows that the tine segment 64 includes two rotor tines 20. In the described embodiment, the rotor tines 20 are spaced apart angularly by approximately 90 degrees; however, any suitable angular spacing may be chosen. The rotor tines 20 on the segment 64 are not of equal length in a radial direction. In particular, a first one 20a of the rotor tines 20 has a length greater than that of a second one 20b of the rotor tines 20. As such, the first tine 20a may also be referred to as a long tine 20a, and the second tine 20b may also be referred to as a short tine 20b. The length of the short tine 20b is only slightly less than that of the long tine 20a, and in any case the length of the short tine 20b is greater than half of the length of the long tine 20a.

In the described embodiment, the two segments 64 forming the tine plate 54 are of similar configuration. That is, each tine plate 54 includes two long tines 20a and two short tines 20b. Furthermore, when the segments 64 are positioned around the rotor shaft 52 to form the tine plate 54 the two long tines 20a are on opposite sides of the rotor shaft 52, i.e. spaced apart by an angle of 180 degrees in the described embodiment. Similarly, the two short tines 20b are on opposite sides of the rotor shaft 52, i.e. spaced apart by an angle of 180 degrees in the described embodiment. That is, each tine plate 54 includes four tines 20 each spaced apart by approximately 90 degrees in the described embodiment.

As illustrated in FIGS. 2 and 3, when the tine plates 54 are arranged in parallel along the rotor shaft 52, the tines 20 of adjacent tine plates 54 are positioned substantially adjacent to one other. As such, four rows or lines of tines 20 are formed along the rotor assembly 50 (because each tine plate 54 has four tines 20), each row being spaced apart by approximately 90 degrees. Note that each row of tines 20 is not a straight line, but instead forms a pattern or shape. Specifically, the shape of each row is defined by the tips or points of each of the tines 20. In the described embodiment, each row of tines 20 forms an approximate 'V-shape', with each side of the 'V' being slightly curved.

As the rows formed by the tines 20 along the rotor shaft 52 are not in the form of straight lines then either the tine plates 54 are formed with the tines 20 at slightly different positions in a circumferential or angular direction, and/or the tine plates 54 are positioned on the rotor shaft 52 at different angular positions. In any case, the difference in angular position between adjacent tines 20 on adjacent tine plates 54 is relatively small such that the tines 20 may indeed still be regarded as being adjacent to each other.

As mentioned above, each of the tine plates 54 includes four tines: two long tines 20a and two short tines 20b. As best seen in FIG. 3, the tine plates 54 are arranged on the rotor shaft 52 such that the long tines 20a of one of the tine plates 54 are positioned adjacent to the short tines 20b of the tine plates 54 on either side of said one tine plate 54. Expressed differently, along a row of tines 20 on the rotor shaft 52 the tines 20 alternate between long and short tines 20a, 20b. As each tine plate 54 has both long and short tines 20a, 20b then adjacent rows of tines 20 on the rotor shaft 52 will also alternate between long and short tines 20a, 20b, but for a given tine plate 54 a short tine 20b will replace a long tine 20, and vice versa.

Many modifications may be made to the above-described embodiments without departing from the scope of the present invention as defined in the accompanying claims.

In the above-described embodiment, each tine plate is formed by two tine plate segments. In different embodiments, each tine plate may be formed from a single piece, or may be formed by more than two plate segments.

In the above-described embodiment, each tine plate has four tines: two long tines and two short tines, with one of each on each of the two plate segments. In different embodiments, each tine plate may have a different number of tines as appropriate, for example a single long tine and a single short tine. In such an example, the long tine may be on one plate segment and the short tine on the other plate segment. Equally, each tine plate may have more than four tines in different embodiments.

In the above-described embodiment, the long tines on each of the tine plates along the rotor are of equal length, and this is also the case for the short tines. In different embodiments, the long tines may vary slightly in length between different tine plates (but still be longer than the short tines). Similarly, in different embodiments from the one described above, the short tines may vary slightly in length between different tine plates (but still be shorter than the long tines).

In the above-described embodiment, each row of tines is not a straight line, but instead forms a pattern or shape such as one or more curves or a V shape. Specifically, the shape of each row is defined by the tips or points of each of the tines 20. As the long and short tines are provided in an alternate manner in each row, the shape of each row is defined by the tips of both the long and short tines. In different embodiments, the long tines in a given row may be considered in isolation from the short tines, and may form their own pattern or shape, e.g. a wave pattern. Similarly, the short tines in a given row may be considered in isolation from the long tines, and may form their own (different) pattern or shape.

The invention claimed is:

1. A tine plate for a rotor cutter apparatus of an agricultural baler, the tine plate being configured for being arranged on a rotatable rotor shaft of the rotor cutter apparatus and for moving crop material collected by the agricultural baler as the rotor shaft rotates, the tine plate comprising:
   at least one first tine, which forms at least one baler rotor first tine configured for rotating about a horizontal axis; and
   at least one second tine spaced angularly from the at least one first tine, the at least one second tine forming at least one baler rotor second tine configured for rotating about the horizontal axis,
   wherein a length of the at least one first tine is greater than a length of the at least one second tine.

2. The tine plate according to claim 1, wherein a length of the at least one second tine is greater than half of a length of the at least one first tine.

3. The tine plate according to claim 1, wherein the tine plate further comprises an inner edge and an outer edge, wherein the inner edge is arranged for mounting to the rotor shaft of the rotor cutter apparatus, and wherein each of the first and second tines is at the outer edge.

4. The tine plate according to claim 1, wherein the angular spacing between each of the first and second tines is less than or equal to 90 degrees.

5. The tine plate according to claim 1, wherein the tine plate comprises two first tines and two second tines.

6. The tine plate according to claim 5, wherein the two first tines are arranged opposite each other such that the two first tines are spaced apart from one another by an angle of 180°, and the two second tines are arranged opposite each other such that the two second tines are spaced apart from one another by an angle of 180°.

7. The tine plate according to claim 1, wherein the tine plate further comprises two tine plate segments.

8. A rotor cutter apparatus for an agricultural baler, the rotor cutter apparatus comprising:
   a rotor shaft; and
   a plurality of tine plates arranged axially along the rotor shaft, each of the plurality of tine plates comprising:
      at least one first tine, which forms at least one baler rotor first tine configured for rotating about a horizontal axis; and
      at least one second tine spaced angularly from the at least one first tine, the at least one second tine forming at least one baler rotor second tine configured for rotating about the horizontal axis,
      wherein a length of the at least one first tine is greater than a length of the at least one second tine,
   wherein one of the at least one first tines of a first one of the tine plates is adjacent to one of the at least one second tines of at least one of the tine plates adjacent to the first one of the tine plates.

9. The rotor cutter apparatus according to claim 8, wherein the at least one first tine of a first one of the tine plates is adjacent to the at least one second tine of each of two tine plates adjacent to the first one of the tine plates.

10. The rotor cutter apparatus according to claim 8, wherein a length of the at least one first tine of a first one of the tine plates is different from a length of the at least one first tine of another one of the tine plates, or a length of the at least one second tine of the first one of the tine plates is different from a length of the at least one second tine of another one of the tine plates.

11. The rotor cutter apparatus according to claim 8, wherein each of the first and second tines has a tip, and wherein the tips of the first and second tines of each of the plurality of tine plates define one or more shapes axially along the rotor shaft.

12. The rotor cutter apparatus according to claim 8, further comprising a scraper including a plurality of spaced apart scraper tines, wherein each of the first and second tines of each of the plurality of tine plates are arranged to intersect the scraper tines as the rotor shaft rotates.

13. The rotor cutter apparatus according to claim 12, wherein the scraper tines are spaced equally apart.

14. The rotor cutter apparatus according to claim 8, further comprising a knife rack including a plurality of spaced apart knives, wherein each of the first and second tines of each of the plurality of tine plates are arranged to direct crop material collected by the agricultural baler towards and over the plurality of knives as the rotor shaft rotates.

15. An agricultural baler comprising a rotor cutter apparatus comprising:
   a rotor shaft; and
   a plurality of tine plates arranged axially along the rotor shaft, each of the plurality of tine plates comprising:
      at least one first tine, which forms at least one baler rotor first tine configured for rotating about a horizontal axis; and
      at least one second tine spaced angularly from the at least one first tine, the at least one second tine forming at least one baler rotor second tine configured for rotating about the horizontal axis,
      wherein a length of the at least one first tine is greater than a length of the at least one second tine,
   wherein one of the at least one first tines of a first one of the tine plates is adjacent to one of the at least one second tines of at least one of the tine plates adjacent to the first one of the tine plates.

* * * * *